G. W. Havermale,
Washing Machine,
No. 67,980. Patented Aug. 20, 1867.

Witnesses:
Theo Tusche
J. A. Service

Inventor:
Geo. H. Havermale
Per Munn & Co.
Attorneys

United States Patent Office.

GEORGE W. HAVERMALE, OF LA HARPE, ILLINOIS.

Letters Patent No. 67,980, dated August 20, 1867.

IMPROVED WASHING MACHINE.

*The Schedule referred to in these Letters Patent and making part of the same.*

TO ALL WHOM IT MAY CONCERN:

Be it known that I, GEORGE W. HAVERMALE, of La Harpe, in the county of Hancock, and State of Illinois, have invented a new and useful Improvement in Washing Machine; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to furnish an improved washing machine, simple in construction, easy to be operated, which will do its work quickly, thoroughly, and without injury to the most delicate fabric, and which will operate with equal efficiency upon a small or large quantity of clothes; and it consists in the combination of the movable dash-board, springs, sliding dasher, crank-shaft, and balance-wheel with each other and with the box or tub in which the washing is done.

Figure 1:
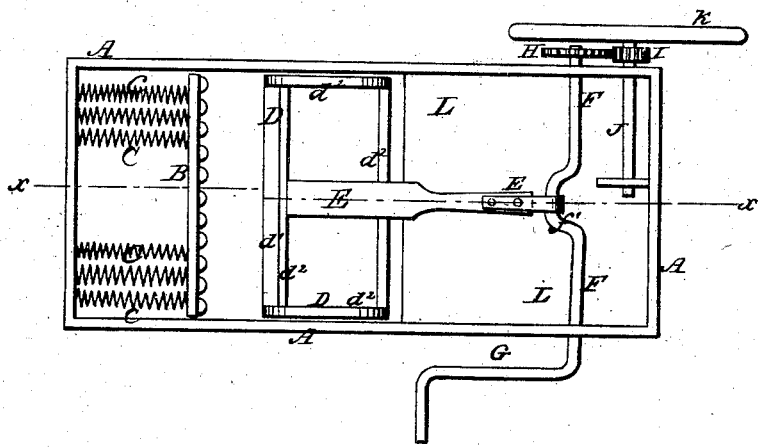
Figure 1 is a top or plan view of my improved machine.
Figure 2:
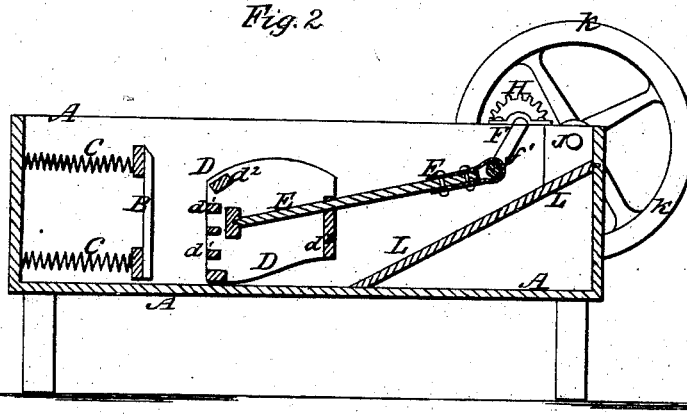
Figure 2 is a vertical longitudinal section of the same, taken through the line $x\ x$, fig. 1.

A is the box or tub, which is rectangular in shape, and a convenient size for which is three feet feet four inches long, eighteen inches wide, and eighteen inches high. B is the movable dash-board, the forward side of which is grooved or has vertical ribs attached to it, as shown in fig. 2. To the rear side of the board B are attached coiled springs, C, the other ends of which are attached to the end board of the box A. The springs C should be made of steel, and they should be galvanized to prevent their being corroded by the action of the water. The lower springs should be made stronger than the upper ones, or their number should be greater, as they have to withstand a greater pressure. The dash-board B and springs C should be so arranged that the said dash-board may have a play of four or five inches. D is the dasher, the front or working side of which is formed of slats $d^1$, which are attached to the frame $d^2$. To the rear part of the dasher D is attached an arm or bar, E, the rear end of which is pivoted to the crank $f'$ formed upon the crank-shaft F. The crank-shaft F revolves in bearings in the sides of the box A, and has a crank, G, attached to one end by means of which it is revolved. To the other end of the crank-shaft F is attached a gear-wheel, H, the teeth of which mesh into the teeth of a smaller gear-wheel, I, attached to the end of the shaft J, which revolves in bearings formed in or attached to the box A, and which carries the balance-wheel K.

As the machine is operated, the dasher D moves back and forth along the bottom of the box A, compressing the clothes between it and the dash-board B, squeezing out the water and dirt, the elasticity of the said dash-board preventing any injury to even the most delicate fabrics. The rear part of the box A may have an inclined board, L, placed in it, as shown in fig. 2, so that less water will be required than would be necessary without said board.

I claim as new, and desire to secure by Letters Patent—

The combination and arrangement of the crank-shaft F, gear-wheel H, pinion I, upon the shaft J, and the balance-wheel K, and press-board B, and beater D, as herein set forth for the purpose specified.

GEORGE W. HAVERMALE.

Witnesses:
C. S. BOWERS,
WM. W. SPENCER.